No. 670,473. Patented Mar. 26, 1901.
L. N. DYHRBERG.
BICYCLE BRAKE.
(Application filed Sept. 9, 1897.)
(No Model.) 2 Sheets—Sheet 1.

Witnesses
Inventor
Laverna N. Dyhrberg
Attorneys

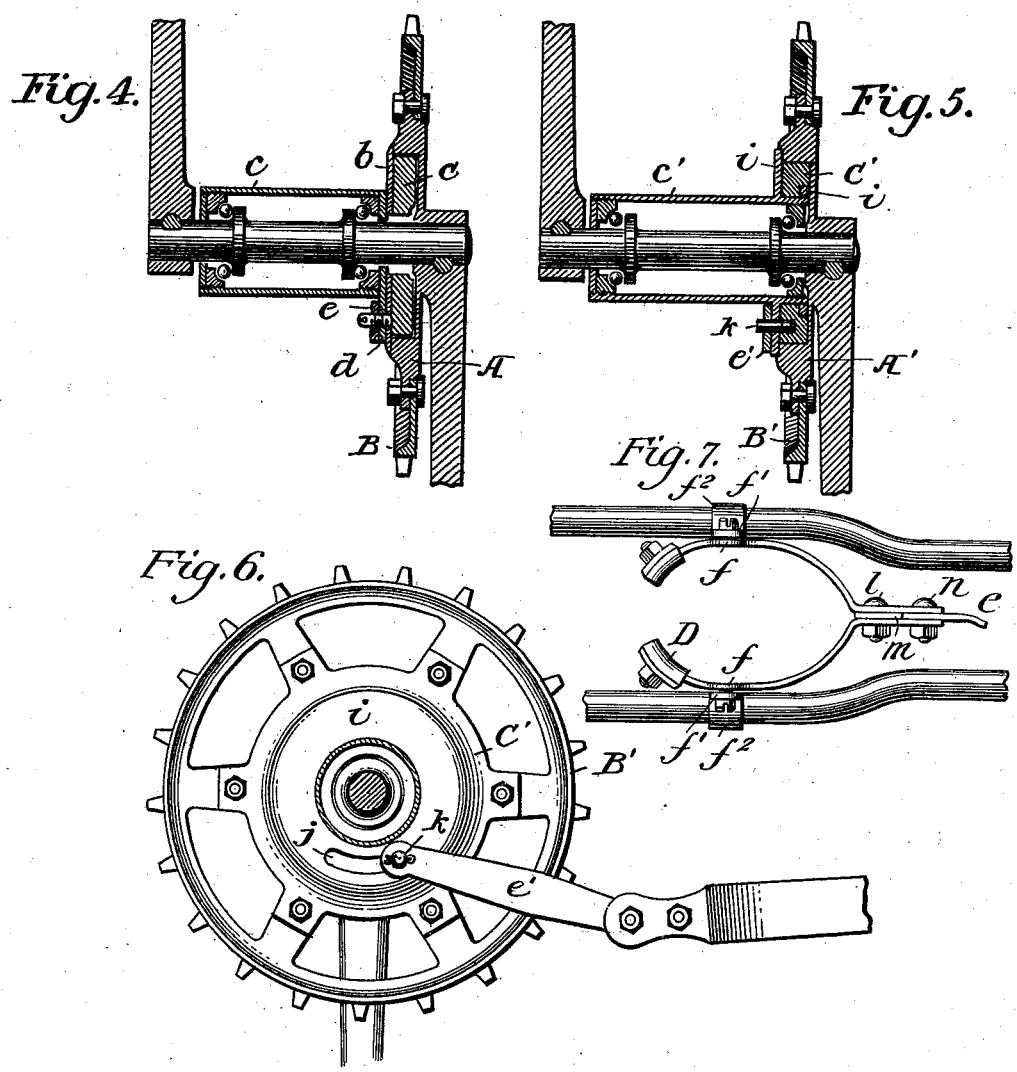

UNITED STATES PATENT OFFICE.

LAVERUX NELSON DYHRBERG, OF ASHBURTON, NEW ZEALAND.

BICYCLE-BRAKE.

SPECIFICATION forming part of Letters Patent No. 670,473, dated March 26, 1901.

Application filed September 9, 1897. Serial No. 651,083. (No model.)

*To all whom it may concern:*

Be it known that I, LAVERUX NELSON DYHRBERG, a subject of the Queen of Great Britain and Ireland, and a resident of Ashburton, Canterbury, in the Colony of New Zealand, have invented certain new and useful Improved Brake-Gearing for Cycles, (for which I have made application for patent in New Zealand, No. 9,301, dated February 24, 1897,) of which the following is a specification.

This invention relates to improved brake-gearing for cycles, the object being to apply an effective brake-power by means of friction clutch-gearing operated by the feet.

In my invention a friction-clutch is fitted in a clutch-box on the driving chain-wheel, to the face of which clutch the brake is connected by means of a suitable rod. The rear chain-wheel forms another clutch-box in which a similar clutch is fitted, (to work in an opposite direction to that on the driving-wheel,) so that when the cranks are turned in a forward direction the driving chain-wheel, with its clutch-box, rotates free of the clutch, while the clutch-box on rear chain-wheel by the action of the chain engages the clutch within it and propels the machine; but when a backward pressure is exerted upon the cranks by the feet the clutch-box on driving chain-wheel engages the clutch within it, thus stopping the motion of the chain and both chain-wheels and at the same time actuating the brake, while the rear wheel of machine is free to rotate until stopped by the brake. When the brake is not required to be used, the clutch on rear wheel may be locked by means of a suitable device, hereinafter described. If desired, instead of a clutch being fitted within the driving chain-wheel for operating the brake a clutch-box may be fitted on the crank at the opposite side of the crank-hanger having a clutch-block within it to which the brake-rod is connected, and in lieu of the clutch-block in rear chain-wheel a clutch-block may be fixed on the crank-spindle and within the driving-wheel, as hereinafter explained.

Figure 1:
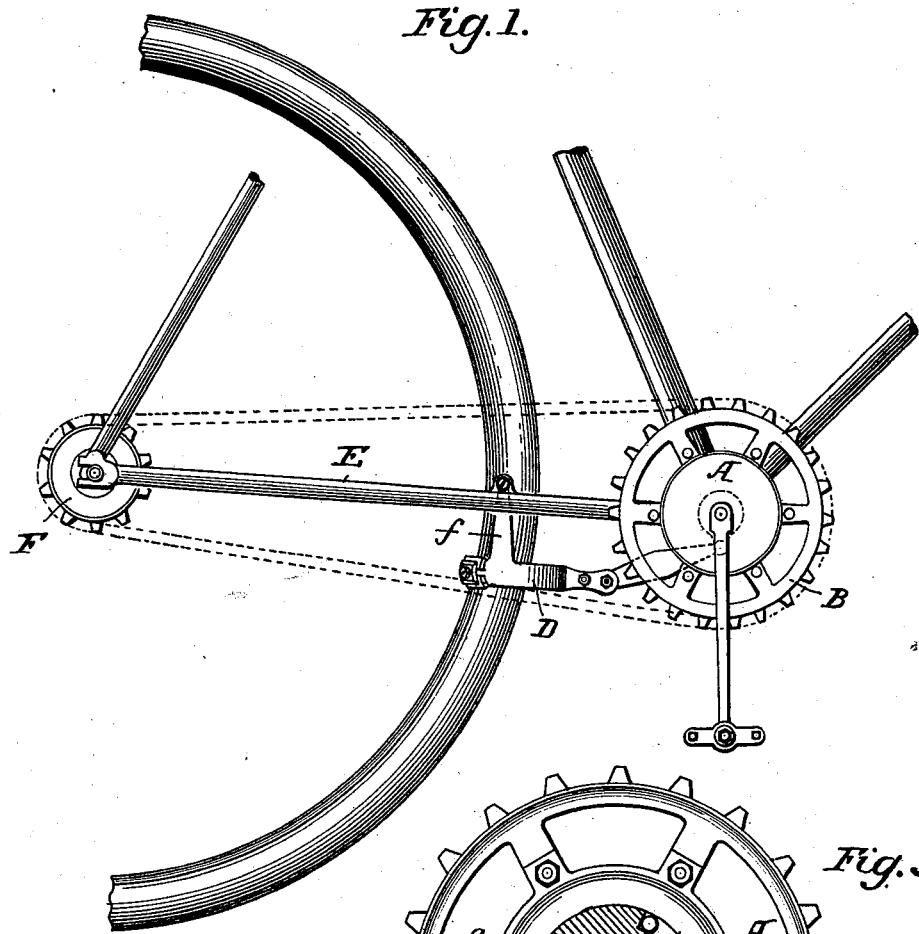
Figure 3:
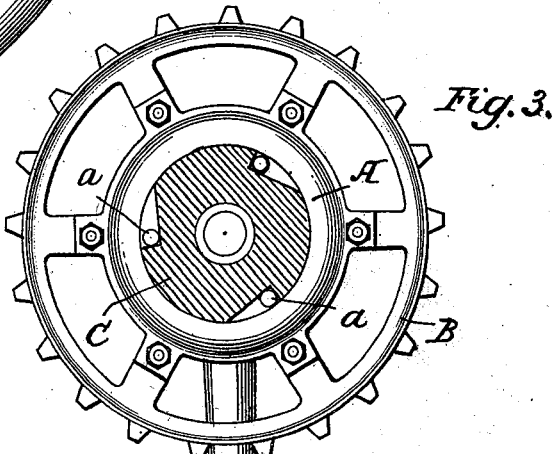
Figure 2:
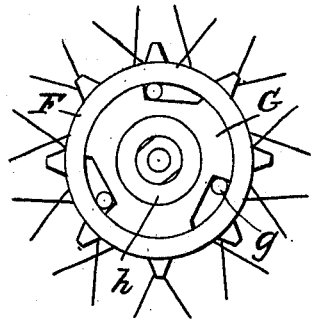

Referring to the drawings, which form a part of this specification, Figure 1 is a side view of a portion of a bicycle, showing the sprocket-chain wheels with clutch-boxes and brake. Fig. 2 is an enlarged sectional view of the clutch-box and clutch on rear wheel, the face-plate being removed. Fig. 3 is an enlarged sectional view of the clutch-box and clutch in driving chain-wheel, the face-plate also being removed. Fig. 4 is an enlarged longitudinal section through the crank-hanger and driving chain-wheel, showing the clutch-box and clutch and hanging crank to which the brake-connecting rod is attached. Fig. 5 is an enlarged longitudinal section through the crank-hanger and driving chain-wheel, showing another mode of attaching the chain-wheel and clutch. Fig. 6 is a side elevation of same, showing brake-connecting rod. Fig. 7 is a plan showing the mode of connecting brake to the rear forks of machine and also the means of attaching brake to connecting-rod.

The same letters of reference denote like parts where they occur in the several figures.

Referring to Figs. 1, 2, 3, and 4, A is the clutch-box, formed on or attached to the driving chain-wheel B, in which clutch-box the clutch-block C and rollers $a$ are fitted, the face-plate $b$, which is fixed to said block, fitting against the end of the crank-hanger $c$ and having a hanging crank $d$, to which the brake D is connected by means of the rod $e$, the arms $f$ of the said brake being pivotally connected to the rear forks E of the machine, as hereinafter described. The brake D is provided with pads of suitable material, which when the power is exerted clip the inner side of the rim of the rear wheel of the machine.

By making the recess in the hub of the wheel cup-shaped—that is, extending from the center toward the periphery—a very strong and cheaply-constructed clutch mechanism is secured, as the block $c$ can be made annular or in the form of a perforated disk which fits within the recess without any additional support than the balls in the recesses in its periphery which bear against the inner wall of the recess in the hub of the wheel. The block is of such a thickness that its outer face is just flush with the side of the hub of the wheel, so that when the plate $b$ is in position its edge will extend beyond the periphery of the block and rest against the side of the hub, thereby closing the recess to prevent the entrance of dust or the escape of the balls. The hub of the wheel is located at such a distance from the end of the crank-hanger that the crank $d$, which is in the form of a perforated plate, will just fit between the hanger and the plate $b$, and thus hold the block $c$ and plate $b$ in position.

The rear chain-wheel F is constructed to form another clutch-box in which the clutch-block G and rollers $g$ are fitted, the said chain-wheel being fitted loosely on the hub $h$, but the clutch-block is screwed thereon.

It will be readily seen that when the machine is driven forward the driving chain-wheel B will rotate free of the clutch-block C and rollers $a$, while the rear chain-wheel F, clutch-block G, and rollers $g$ therein rotate with the wheel of the machine; but when a backward pressure is imparted to the cranks the clutch-block C causes the rollers $a$ to engage the clutch-box A, and simultaneously by means of the chain the rollers $g$ are caused to disengage from the clutch-box of the rear chain-wheel F, thereby stopping the motion of both chain-wheels and chain, and at the same time drawing the brake D against the rim of the rear wheel, which is enabled to rotate free of the chain-wheel F and clutch until stopped by the brake.

Referring to Figs. 5 and 6, which illustrate another mode of attaching the driving chain-wheel B' with clutch-box A' and clutch-block C' with rollers therein it will be seen that the crank-hanger $c'$ is lengthened and provided with a flange $i$, forming the face-plate of the clutch-block C', this flange being provided with an arc-shaped slot $j$, through which a pin $k$, secured into the clutch-block C', passes, and to which pin the brake-connecting rod $e'$ is secured, another flange $i'$ being secured to the end of the crank-hanger to retain said clutch-block in position. In this arrangement, when the backward pressure is imparted to the cranks, the clutch-block C' is caused to turn back when the pin $k$ moves in the slot $j$ and draws up the brake upon the rim of the rear wheel of the machine.

Referring to Fig. 7, which more fully illustrates the brake D and mode of connecting it to rod $e$ and also to the rear forks E, it will be seen that the brake is formed of two parts and that the arms $f$ are pivotally connected to the lugs $f'$, formed on said rear forks, by means of screws $f^2$, which are passed loosely through said lugs and screwed into the arms $f$, a shoulder being formed on each screw so as to be flush with the inside of the lug to prevent jamming. The two parts of the brake are brought together outside the wheel and secured by a bolt and nut $l$, with a thickness piece or washer $m$ between the said two parts, the end of rod $e$ being placed between the said parts and pivotally connected by means of the bolt and nut $n$.

Having now described my invention, what I claim as new, and desire to secure by Letters Patent, is—

In a brake for bicycles, the combination with the pedal-shaft, of a clutch thereon operative only on back-pedaling, a clutch on the rear wheel inoperative on back-pedaling, a lug on each side of the rear fork, a brake member provided with an arm pivotally secured to each lug, the rear end of the member being provided with a pad to engage with the rim of the rear wheel, and the front ends of the two members being curved toward each other and rigidly secured together, and a brake-rod pivotally secured between the perforated portions of the arms at one end and connected with the clutch on the crank-shaft at the other.

In witness whereof I have hereunto set my hand in presence of two witnesses.

LAVERUX NELSON DYHRBERG.

Witnesses:
A. H. HART,
GEORGE HART.